3,322,794
PROCESS FOR THE PREPARATION OF
7-AMINOCOUMARINS
Jorg Haeberli, Warwick, R.I., assignor to Geigy Chemical Corporation, Greenburgh, N.Y., a corporation of Delaware
No Drawing. Filed Aug. 31, 1964, Ser. No. 393,369
10 Claims. (Cl. 260—343.2)

The present invention relates to a new and improved procedure for the preparation of certain 7-aminocoumarin derivatives and, more specifically, to such 7-aminocoumarin derivatives as may be circumscribed by the following general formula:

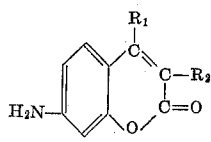

wherein $R_1$ represents hydrogen or an alkyl group and $R_2$ stands for hydrogen or an alkyl or aryl group.

7-aminocoumarin derivatives of this formula have fluorescent properties and are therefore useful as optical brightening agents. These compounds can also be employed as intermediates for the production of other optical brightening agents, as is evident to those skilled in the art.

In accordance with the teaching of the prior art, viz U.S. Patent No. 3,008,969, 7-aminocoumarins of the above formula can be synthesized by condensing a β-keto ester with ethyl m-hydroxyphenyl carbamate in the presence of a specified cyclizing agent, and subsequently hydrolysing the carbamate group. The ethyl m-hydroxyphenyl carbamate used in this prior art process is, in other words, an aminophenol wherein the free amino group is protected by a carbalkoxy group. The above patent teaches specifically that the amino group must be protected in this synthesis.

The above prior art process thus has the disadvantage that it requires that the free amino group of the aminophenol be protected prior to condensation and liberated after condensation. This process thus involves two distinct steps or operations and is complex and time-consuming. By contrast, in the subject process to be discussed in greater detail below, there is no need at all to provide any protective groups. The subject process is therefore a simple one-step procedure which is more economical as it is productive of higher yields, and is simpler in technique and equipment as well as less time-consuming. These and other advantages which form the objects of the invention will become apparent hereinbelow.

I have now found that in the preparation of 7-aminocoumarins the amino group in the aminophenol used as starting material need not be protected. More particularly, I have found that 7-aminocoumarins of the above formula can be directly prepared by reacting an aminophenol, especially 3-aminophenol, with β-substituted acrylic acids or derivatives thereof, in a suitable inert solvent medium in the presence of a Lewis acid as condensing agent and at elevated temperatures. It is surprising and unexpected that this condensation reaction proceeds with great ease and in excellent yields with the amino group in the phenol being unprotected.

This reaction can be illustrated more particularly by the following equation:

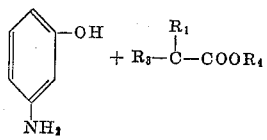

or

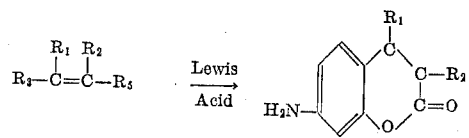

wherein $R_1$ and $R_2$ have the significance ascribed to them above; however, alkyl and aryl are more preferably lower alkyl and phenyl, respectively, $R_3$ is hydroxy, acyloxy, lower alkoxy, p-chlorophenylcarbamoyloxy, metal salts derived from hydroxy, amino, alkylamino, nitrophenylamino or m-hydroxyphenylamino, $R_4$ represents hydrogen, alkyl, particularly lower alkyl, or phenyl, and $R_5$ stands for nitrile or amides such as —$CONHR_4$, $R_4$ being as defined above.

Preferred β-substituted acrylic acid derivatives in the practice of this invention are ethyl β-hydroxy-α-phenylacrylate, β-hydroxy-α-phenylacrylonitrile, ethyl β-methoxy-α-phenylacrylate, β-methoxy - α - phenyl-acrylonitrile, ethyl β-(m-hydroxyphenylamino)-α-phenylacrylate and β-(m-hydroxyphenylamino)-α-phenylacrylonitrile.

As stated above this reaction is effected in the presence of a condensing agent which can be a Lewis acid such as aluminum chloride, aluminum bromide, hydroxy aluminum dichloride, boron trifluoride and boron fluoride ethyl ether. The condensing agent chosen is employed in effective amounts, i.e. amounts ranging from 0.1 to 2.0 mole based on acrylic acid derivative with a preferred range being 0.9 to 1.3 mole based on acrylic acid derivative and the most preferred concentration being about 1.1 mole based on acrylic acid derivative used.

The process is carried out in the presence of an inert solvent such as nitrobenzene, p-nitrotoluene, m-nitrochlorobenzene, 1,1,2,2-tetrachloroethane or other similar solvents with nitrobenzene being particularly preferred and at temperatures ranging from about 60 to about 200° C. with a preferred temperature range being about 90 to about 150° C. and the most preferred temperature being approximately 130° C.

Upon completion of the reaction, the reaction mixture is treated by adding isopropanol followed by water until a solution is obtained. Concentrated hydrochloric acid is then added and the hydrochloride of the desired product is crystallized. The product may also be isolated by other conventional methods.

The materials employed in the subject process are either commercially available as, for instance, 3-aminophenol, the solvents, the Lewis acids and some of the acrylic acid derivatives used or they can be readily prepared in accordance with prior art methods well-known to those skilled in the art.

The preferred embodiments of the instant invention are the processes for the production of 7-amino-3-phenylcoumarin which comprise condensing 3-aminophenol with either ethyl β-hydroxy-α-phenylacrylate or β-hydroxy-α-phenylacrylonitrile in nitrobenzene in the presence of aluminum chloride and at a temperature ranging between about 90 and 150° C.

In order that those skilled in the art may better understand how the present invention can be carried into effect, the following examples are given by way of illustration but not by way of limitation. Degrees are given in degrees centigrade.

*Example 1*

To 17.7 g. of anhydrous aluminum chloride in 127.5 g. of nitrobenzene was added with external cooling 23.2 g.

of ethyl β-hydroxy-α-phenylacrylate, followed by 14.6 g. of 3-aminophenol. The mixture was heated in one hour to 100° and was held at this temperature for one hour. During this holding period a solid was formed. The slurry was heated to 130° and held for 90 minutes at this temperature. The reaction mixture was cooled to 80° and 89.5 g. of isopropanol was added, followed by 48.5 g. of water. The solution was heated to 80° and 31 g. of 37% hydrochloric acid was added dropwise. The hydrochloride of 7-amino-3-phenylcoumarin crystallized in small needles. The isolated product weighed 18.0 g. and had a melting point of 254–260°. This product was converted into the yellow-green 7-amino-3-phenylcoumarin of melting point 208–209° by treatment with a base, such as diluted sodium hydroxide.

In all the subsequent examples, the general procedure described in Example 1 was followed. Therefore, only the differences in comparison to Example 1 will be given in the ensuing examples.

Example 2

The maximum temperature of reaction was 90° instead of 130°. There was isolated 9.1 g. of 7-amino-3-phenylcoumarin hydrochloride.

Example 3

The maximum temperature of reaction was 165° instead of 130°. The isolated 7-amino-3-phenylcoumarin hydrochloride weighed 12.8 g.

Example 4 p-Nitrotoluene instead of nitrobenzene was used as solvent. The yield in 7-amino-3-phenylcoumarin hydrochloride was 56% of theory based on ethyl β-hydroxy-α-phenylacrylate.

Example 5

1,1,2,2-tetrachloroethane was employed instead of nitrobenzene as solvent. There was isolated 6.4 g. of 7-amino-3-phenylcoumarin.

Example 6

2.38 g. of water was added after the charge of aluminum chloride. The mixture was heated to 130° and 90–95% of theory of the required amount of hydrogen chloride demanded for the formation of hydroxy aluminum dichloride was removed from the mixture by purging with dry nitrogen. The solution was cooled to 20° prior to the addition of ethyl β-hydroxy-α-phenyl acrylate. There was isolated 2.8 g. of 7-amino-3-phenylcoumarin.

Example 7

6.4 g. of boron trifluoride was admitted to the solvent at 0° instead of aluminum chloride. Simultaneous with the addition of ethyl β-hydroxy-α-phenylacrylate, 2.8 g. of boron trifluoride was admitted. 7-amino-3-phenylcoumarin (3.0 g.) was isolated.

Example 8

18.9 g. of boron trifluoride ethyl ether instead of aluminum chloride was added. 7-amino-3-phenylcoumarin (3.6 g.) was isolated.

Example 9

25.0 g. of ethyl β-methoxy-α-phenylacrylate was utilized instead of ethyl β-hydroxy-α-phenylacrylate. The isolated 7-amino-3-phenylcoumarin hydrochloride weighed 20.6 g.

Example 10

41.8 g. of ethyl β-(p-chlorophenylcarbamoyloxy)-α-phenylacrylate was employed instead of ethyl β-hydroxy-α-phenylacrylate. 7-amino-3-phenylcoumarin hydrochloride (17.7 g.) was isolated.

Example 11

28.3 g. of ethyl β-acetoxy-α-phenylacarylate was used instead of ethyl β-hydroxy-α-phenylacrylate. The hydrochloride of the desired product weighed 11.4 g.

Example 12

24.2 g. of the aluminum complex of ethyl β-hydroxy-α-phenylacrylate and 12.3 g. of aluminum chloride was employed instead of ethyl β-hydroxy-α-phenylacrylate and 17.7 g. of aluminum chloride. The isolated hydrochloride of 7-amino-3-phenylcoumarin weighed 20.2 g.

Example 13

25.9 g. of the sodium salt of ethyl β-hydroxy-α-phenylacrylate was used instead of ethyl β-hydroxy-α-phenylacrylate. The isolated 7-amino-3-phenylcoumarin hydrochloride weighed 16.8 g.

Example 14

20.9 g. of the copper complex of ethyl β-hydroxy-α-phenylacrylate was employed. The hydrochloride of the desired product amounted to 8.7 g.

Example 15

17.4 g. of β-hydroxy-α-phenylacrylonitrile instead of ethyl β-hydroxy-α-phenylacrylate was used. Isolated was 18.5 g. of the hydrochloride of 7-amino-3-phenyl coumarin.

Example 16

29.9 g. of ethyl β-butylamino-α-phenylacrylate was used instead of ethyl β-hydroxy-α-phenylacrylate. The yield in 7-amino-3-phenylcoumarin hydrochloride was 47% of theory based on ethyl-β-butylamino-α-phenylacrylate.

Example 17

28.6 g. of β-(m-hydroxyphenylamino)-α-phenyl-acrylonitrile and 1.5 g. 3-aminophenol instead of ethyl β-hydroxy-α-phenylacrylate and 14.6 g. of 3-aminophenol was employed. The isolated 7-amino-3-phenylcoumarin weighed 5.4 g.

Example 18

34.2 g. of ethyl β-(m-hydroxyphenolamino)-α-phenylacrylate and 1.5 g. of 3-aminophenol was used instead of ethyl β-hydroxy-α-phenylacrylate and 14.6 g. of 3-aminophenol. The hydrochloride of 7-amino-3-phenylcoumarin amounted to 18.7 g.

Example 19

37.8 g. of ethyl β-(m-nitrophenylamino)-α-phenylacrylate instead of ethyl β-hydroxy-α-phenylacrylate was employed. The isolated 7-amino-3-phenylcoumarin weighed 15.3 g.

Example 20

19.2 g. of β-hydroxy-β-methyl-α-phenylacrylonitrile was used instead of ethyl β-hydroxy-α-phenylacrylate. After the hydrochloric acid was added the mixture was diluted with water and was allowed to stand. A total of 30 g. of a solid was isolated. From 2.0 g. of this solid, with the aid of chromatographic techniques, 0.06 g. of 7-amino-4-methyl-3-phenylcourmarin of M.P. 276° was obtained.

Example 21

Nitrobenzene (800 g.) was charged to a 1.5 l. three-necked flask. 215 g. of aluminum chloride was added with stirring. Then 218 g. of β-hydroxy-α-phenylacrylonitrile was added followed by addition of 109 g. of 3-aminophenol. The reaction mixture, the temperature of which rose to 70° with the addition of the aminophenol, was heated to 80° and maintained for one hour under stirring at 80–90°. The reaction mixture was then heated to 130° and stirred for 24 hours at 130–135°. The mixture was then cooled to 80° and transferred to a 3 l. flask to which 825 g. of isopropanol was added, followed by the addition of 450 ml. of water. The reaction mixture was then heated to reflux and under slow stirring 128 g. of hydrochloric acid as a 32% aqueous solution was added within 1½ hours. During this addition the hydrochloride of 7-amino-3-phenylcoumarin crystallized in almost colorless crystals. The hydrochloride was converted to 7-amino-3-phenylcoumarin by treatment with about 50 g. of sodium hydroxide. Obtained was 230 g. of the desired product; yield: 64.7% based on the acrylonitrile used; M.P. 208–209°.

What is claimed is:

1. A process for the production of 7-amino-3-phenylcoumarin which comprises condensing in an inert solvent 3-aminophenol with a member selected from the group consisting of ethyl β-hydroxy-α-phenylacrylate, β-hydroxy-α-phenylacrylonitrile, ethyl β-methoxy-α-phenylacrylate, β-methoxy-α-phenylacrylonitrile, ethyl β-(m-hydroxyphenylamino)-α-phenylacrylate, β-(m-hydroxyphenylamino)-α-phenylacrylonitrile, in the presence of a condensing agent selected from the group consisting of aluminum chloride, aluminum bromide, hydroxy aluminum dichloride, boron trifluoride and boron fluoride ethyl ether and at a temperature between the range of about 60 and 200° C.

2. The process of claim 1 wherein the condensing agent is aluminum chloride.

3. The process of claim 1 wherein the temperature is between the range of about 90 and 150° C.

4. The process of claim 1 wherein the temperature is between the range of about 90 and 150° C. and the condensing agent is aluminum chloride.

5. A process for the production of 7-amino-3-phenylcoumarin which comprises condensing 3-amino-phenyl with ethyl β-hydroxy-α-phenylacrylate in an inert solvent selected from the group consisting of nitrobenzene, p-nitrotoluene, m-nitrochlorobenzene and 1,1,2,2-tetrachloroethane in the presence of a condensing agent selected from the group consisting of aluminum chloride, aluminum bromide, hydroxy aluminum dichloride, boron trifluoride and boron fluoride ethyl ether, and at a temperature between the range of about 60 and 200° C.

6. The process of claim 5 wherein the condensing agent is aluminum chloride.

7. The process of claim 5 wherein the temperature is between the range of about 90 and 150° C.

8. The process of claim 5 wherein the solvent is nitrobenzene.

9. A process for the production of 7-amino-3-phenylcoumarin which comprises condensing in nitrobenzene 3-aminophenol with ethyl β-hydroxy-α-phenylacrylate in the presence of aluminum chloride and at a temperature between the range of about 90 and 150° C. and isolating the product 7-amino-3-phenylcoumarin.

10. A process for the production of 7-amino-3-phenylcoumarin which comprises condensing in nitrobenzene 3-aminophenol with β-hydroxy-α-phenylacrylonitrile in the presence of aluminum chloride and at a temperature between the range of about 90 and 150° C. and isolating the product 7-amino-3-phenylcoumarin.

References Cited

UNITED STATES PATENTS 2,647,132   7/1953   Long et al. _____ 260—343.2

OTHER REFERENCES

Sethna et al., Chemical Reviews, volume 36, No. 1 (1945), pp. 4, 12–14 and 17.

WALTER A. MODANCE, *Primary Examiner.*

JAMES A. PATTEN, *Assistant Examiner.*

UNITED STATES PATENT OFFICE
CERTIFICATE OF CORRECTION

Patent No. 3,322,794                              May 30, 1967

Jorg Haeberli

It is hereby certified that error appears in the above numbered patent requiring correction and that the said Letters Patent should read as corrected below.

Column 1, line 67, for "$R_3-\overset{R_1}{\underset{|}{C}}-COOR_4$" read -- $R_3-\overset{R_1}{\underset{|}{C}}=\overset{R_2}{\underset{|}{C}}-COOR_4$ -- column 4, line 43, for "(m-hydroxyphenolamino)" read -- (m-hydroxyphenylamino) --; column 5, line 31, for "phenyl" read -- phenol --.

Signed and sealed this 9th day of January 1968.

(SEAL)
Attest:

Edward M. Fletcher, Jr.                           EDWARD J. BRENNER

Attesting Officer                                    Commissioner of Patents